Patented Apr. 22, 1952

2,593,414

UNITED STATES PATENT OFFICE 2,593,414

PROCESS FOR MIXING AND COPRECIPITATING A POLYSULFONE RESIN LATEX WITH ANOTHER LATEX

Willie W. Crouch, Bartlesville, Okla., assignor to Phillips Petroleum Company, a corporation of Delaware No Drawing. Application October 21, 1948, Serial No. 55,830

14 Claims. (Cl. 260—45.5)

1

This invention relates to synthetic resinous materials and to an improved method for their production. In one embodiment it relates to the production of synthetic resinous materials formed by the reaction between unsaturated organic compounds and sulfur dioxide employing a modifying agent. In a more specific embodiment this invention relates to the production of an improved homogeneous olefin-sulfur dioxide resin wherein a modifying agent, such as a polymerized aliphatic conjugated diolefin, is used.

It has been well known for a number of years that sulfur dioxide will react with numerous unsaturated organic materials to form heteropolymeric resinous products. Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. Organic compounds which enter into the formation of such resins include mono-olefins cyclo-olefins, substituted aliphatic olefins such as styrene, diolefins such as butadiene, isoprene, cyclohexadiene, and the like, acetylenes and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, etc. When mixtures of such unsaturated organic compounds are used, the resulting resin appears to have been formed by a copymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture of organic un-

2 saturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

Most of the resins heretofore produced have generally been formed in the presence of only a moderate excess of sulfur dioxide and have been recovered as solid materials possessing a horn-like appearance or having a porous expanded form. These materials are tough and difficult to handle. In order to secure successful commercial products it has been necessary to grind these mechanically in order to form a finely divided material, thus facilitating removal of occluded impurities. Even when ground to a fine powder, it has often been difficult to remove completely all of the occluded impurities, such as uncombined reactants and other materials either present in the reactants as charged to the process or introduced in processing and handling the resin. In some instances it appears that the grinding procedure results in the introduction of minute quantities of metallic impurities which affect the clarity and general appearance of the molded products. Further, the grinding procedure develops undesirable heat which tends to soften the resin and cause the ground particles of resin to fuse, thus increasing the difficulty of the removal of impurities and in some instances resulting in an unsatisfactory molding powder because of particle size. Also, even if the grinding operation results in a satisfactory, fine powder, the removal of occluded impurities is difficult and expensive.

In a co-pending application, Serial No. 8,755, filed February 16, 1948, a method is disclosed whereby an unsaturated organic compound and sulfur dioxide are caused to react to produce resinous products of varied properties and wide adaptability, said products being readily freed from unreacted reactants and other impurities. The process comprises reacting the unsaturated organic compound and sulfur dioxide in aqueous emulsion in the presence of suitable catalysts and emulsifying agents. When the reaction is carried out in aqueous emulsion the material remains in a fluid condition and can be agitated readily, thus maintaining adequate contact of the reactants at all stages of the conversion. The resinous product, which is obtained in the form of an emulsion, can be stripped with steam to remove unreacted sulfur dioxide, unreacted unsaturated material, and other volatile impurities. It can also be readily washed and the removal of additional impurities is accomplished in this manner. The resin is obtained in a finely divided form and thus the grinding or pulverizing operation that must ordinarily be performed is eliminated.

The versatility of a resin can usually be greatly extended by modification of its properties by the incorporation therein of minor amounts of suitable modifying agents, plasticizers and the like. One well known method for the incorporation of such materials lies in milling the additive into the heat softened resin. However, such operations require special equipment and considerable expenditure of time and power to secure the even distribution of the additive through the resin necessary to produce a homogeneous product. Furthermore, the application of hot milling processes to the incorporation of modifying agents in unsaturated organic compound-sulfur dioxide resins is often deleterious to the product. These resins are sensitive to elevated temperatures such as may be necessary to produce the degree of softening for optimum milling conditions and when so treated may undergo degradative breakdown.

A method has now been discovered for the production of unsaturated organic compound-sulfur dioxide resins wherein a modifying step is an integral part of the process, said modifying step comprising the introduction of a modifying agent into the latex of the unsaturated compound-sulfur dioxide resin prior to coagulation and subsequently coprecipitating the modifying agent with the resin to provide a homogeneous modified product. By the process of this invention a series of modified resins of useful properties have been prepared which have not hitherto been known. In a broad sense, the novel resins of this invention comprise an unsaturated organic compound-sulfur dioxide resin modified with selected polymeric materials prepared by the polymerization of monomers having not more than 20 carbon atoms per molecule. More specifically, these products are compositions of olefin-sulfur dioxide resins with polymers of compounds containing an active vinyl group, such as aryl olefins; acrylic and substituted acrylic acids, esters, nitriles, and amides; methyl isopropenyl ketone; vinyl chloride; and the like; polymerizable aliphatic conjugated diolefins; and copolymers of the said compounds containing an active vinyl group with said conjugated diolefins. Some specific examples of such polymeric materials which may be used as modifying agents in this invention include those prepared by polymerizing 1,3-butadiene, isoprene, styrene, butadiene-styrene mixtures, butadiene-acrylonitrile mixtures, butadiene-vinyl pyridine mixtures, and the like.

An object of this invention is to produce novel synthetic resinous materials.

Another object of this invention is to react sulfur dioxide and an unsaturated organic compound to form a heteropolymeric resin.

Another object of this invention is to provide a method for the production of olefin-sulfur dioxide resins wherein a modification step is an integral part of the method.

Still another object of this invention is to modify olefin-sulfur dioxide resins by coprecipitation of the resin from a mixed latex wherein a latex of a selected polymeric material is a constituent.

Still another object of this invention is to incorporate a modifying agent latex with a sulfur dioxide-olefin latex prior to coagulation of the resin.

Still another object is to provide an improved modified homogeneous olefin-sulfur dioxide resin.

Other objects and advantages of this invention will be apparent to those skilled in the art from the accompanying disclosure and discussion.

The method of this invention comprises the following steps: (a) preparing an unsaturated organic compound-sulfur dioxide resin latex; (b) preparing a latex of the modifying agent; (c) commingling a controlled proportion of the modifying latex of (b) with the resin latex of (a); (d) coprecipitating the resulting mixed latex; and (e) recovering and drying the modified resin.

A significant feature of the process of this invention lies in the discovery that acid sensitive latices may be employed as the modifying agents. In many instances the latices of such materials as polystyrene, polyvinyl chloride, butadiene-styrene copolymer, and the like, have a pH value higher than seven and when contacted with an acid medium such as the usual, acidic olefin-sulfur dioxide resin latex, are coagulated thereby. However, it has been discovered that these seemingly incompatable materials have excellent modifying properties when the pH of the said olefin-sulfur dioxide resins is adjusted to conform with that of the modifying agent prior to commingling of the latices. It has been found that the olefin-sulfur dioxide resin is not coagulated by such pH adjustment and that when so operating the latices can be thoroughly admixed without precoagulation of either component.

Coprecipitation of the combined latices may be effected by any suitable means. One method which has been found applicable comprises treating the mixture with an amount of methanol just short of that required for coagulation of the olefin-sulfur dioxide latex, then adding simultaneously methanol and a 25 per cent aqueous sodium chloride brine until the precipitation is complete. Thorough agitation during the precipitation insures a homogeneous product.

Unsaturated organic compounds which are applicable in this invention are those which will react with sulfur dioxide to produce heteropolymeric compounds, under the other conditions heretofore employed by the prior art. Most of such reactants contain an olefinic linkage, and may be represented by the formula

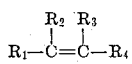

wherein $R_1$ and $R_2$ may be hydrogen halogen, cyano or alkyl, or $R_1$ may be a constituent of a carbocyclic ring in which $R_4$ is a member, and $R_3$ and $R_4$ may be hydrogen, halogen, alkyl, alkenyl, aryl, aralkyl, or have an acetylenic, a carboxylic, an ester or an ether linkage, or substituted groups thereof wherein substituents such as halo, nitro, hydroxyl, carboxylic, cyano, and the like may be present, or $R_4$ may be a constituent of a carbocyclic ring in which $R_1$ is also a member. In general, the olefinic compound employed will not contain more than twenty carbon atoms per molecule. Examples of olefinic or unsaturated compounds which may be used include 1-butene, 2-butene, propylene, isobutylene, pentenes, hexenes, cyclohexene, butadienes, styrene, alpha-methyl styrene, alpha-chloro styrene, vinyl acetylenes, vinyl chloride, vinyl bromide, and the like. It is also frequently desired to employ a mixture of olefinic compounds rather than a single olefinic compound in carrying out the process of this invention.

In the practice of this invention, the resin latex is generally made by reacting together in an aqueous emulsion substantially equimolar proportions of olefinic compound and sulfur dioxide. However, it is sometimes desired to use a molar excess of sulfur dioxide, say a 2:1 mol ratio of sulfur dioxide to olefinic material. In some cases it may even be desirable to use a higher ratio of the one reactant to the other, for example, a ratio of 5:1, or greater, depending upon operating conditions, olefinic material employed, amount of aqueous medium, etc., although it appears that, even in such cases, equimolar quantities of sulfur dioxide, and olefinic compound enter into reaction.

Emulsifying agents which are especially applicable in making the resin latex are those which are active in an aqueous medium which has a pH below 7. The aqueous medium in the emulsion used generally has a pH of about 1 to 3, and sometimes has a pH as low as about 0.5. The emulsifying agent used should, of course, be effective at the pH of the aqueous medium in the reaction mixture. Among the compounds which have been found effective are the long chain alkyl sulfates and the branched chain aliphatic or aromatic sodium sulfonates, salts of organic bases such as amine salts, and quaternary ammonium salts. Examples of these materials are lauryl sodium sulfate, diamyl sodium sulfosuccinate, di-secondary-butyl naphthalene sodium sulfonate, dodecylamine hydrochloride, dodecylamine sulfate, and the like. The amount of emulsifying agent employed is that quantity which is necessary to produce a stable emulsion of the ingredients. In some cases an amount as low as about 1 part per 100 parts reactants (olefin plus sulfur dioxide) is considered sufficient and usually an amount not to exceed about 10 parts is added.

Catalysts applicable in this process are the same as those which have been found effective when carrying out the reaction between olefinic compounds and sulfur dioxide by methods heretofore employed. Examples of these catalytic materials include nitrates of the alkali metals and ammonium, nitric acid, potassium persulfate, hydrogen peroxide, organic peroxides, such as cumene hydroperoxide, peracetic acid, and the like. The amount of catalyst used may vary over a wide range and will depend upon the material chosen. In cases where alkali metal nitrates or ammonium nitrate are employed, the amount may vary from 0.03 to 0.60 part per 100 parts reactants with an amount ranging from 0.15 to 0.45 part being generally preferred. With other materials the quantity of catalyst used may be somewhat higher but in any event it is determined by the case at hand.

Temperatures for producing the resin latex will usually fall within the range of about −10 to about 60° C., with the narrower range 10 to 50° C. being most frequently preferred. However, in some instances it may be considered advisable to employ temperatures below −10° C. in order to get a more satisfactory reaction.

Obviously, when polymerizations are carried out in aqueous emulsion in the absence of freezing point depressants, temperatures below the freezing point of the aqueous medium cannot be employed, however, by use of various additive agents in the emulsion lower temperatures may be used. An example of such a low temperature system is a glycerin-water solution, and the term "aqueous emulsion" should be construed to include the use of an aqueous medium comprising water and a sufficient amount of a water-soluble component to lower the freezing point below the desired polymerization temperature, whether or not the actual polymerization temperature is above or below 0° C. It is generally preferred that the emulsion be of an "oil in water" type, with the ratio of aqueous medium to organic monomeric material between about 1.5:1 and about 10:1, in parts by weight. At low ratios the emulsions tend to have high viscosities and at high ratios the yield per unit volume of reactor per unit of time is low. In the resin latex, suitable means will be necessary to establish and maintain an emulsion and to remove reaction heat to maintain a desired reaction temperature. The polymerization may be conducted in batches, semicontinuously or continuously. The total pressure on the reactants in making the resin latex is preferably at least as great as the total vapor pressure of the mixture, so that the initial reactants will be present in liquid phase. The reaction time may vary from one to 50 hours, depending upon the catalyst and olefinic material employed, temperature and other factors, but usually 5 to 30 hours are preferred. When the desired degree of conversion has been attained, unreacted olefinic material and sulfur dioxide, together with any volatile impurities, may be removed by any suitable means, such as by weathering or by heating, say from about 40 to 60° C. under reduced pressure.

The modifying latex may be prepared by polymerizing, in aqueous emulsion, any suitable monomeric materials, according to methods well known in the art. Emulsion polymerization methods are particularly important and are widely used in the manufacture of synthetic rubber, and the like. In the practice of this invention, the modifying latex is generally made by polymerization or copolymerization in an aqueous emulsion the monomeric material to be used, such as aryl olefins, polymerizable aliphatic conjugated diolefins, copolymers of said aryl olefins or active vinyl compounds with said diolefins, and the like. Any suitable emulsifying agent may be used in this polymerization step, such as aliphatic long chain carboxylic and sulfonic acid salts, sulfonated long chain alcohol and amines, as well as aromatic alkylated sulfonic acid salts and the like. Specific examples of such materials are lauryl sodium sulfate, diamyl sodium sulfosuccinate, di-secondary-butyl naphthalene sodium sulfonate, dodecylamine sulfate, and the like. The amount of emulsifying agent employed is that quantity which is necessary to produce a stable emulsion of the ingredients. In some cases, an amount as low as 1 part per 100 parts of reactants is considered sufficient and usually an amount not to exceed 10 parts is added.

The catalysts applicable in this step of this processes are the same as those which have been found to be active in carrying out emulsion polymerization reactions, some of which contain oxidizing properties. Examples of these catalytic materials include oxygen, ozone, hydrogen peroxide, organic peroxides and ozonides, persulfates, percarbonates, perborates and similar substances. The amount of catalyst used may vary over a wide range and will depend upon the material chosen, but usually the amount of catalyst used will be between about 0.01 and 1 part per 100 parts of reactants, but in any case the amount is usually determined for the particular case at hand.

The temperature for producing the modifying agent latex for use in this invention will usually fall in the range of −10 to 60° C., with a narrower range of 10 to 50° C. being usually preferred. However, in some cases it may be advisable to employ temperatures below −10° C. Of course, when using the low temperatures an anti-freeze agent must be employed.

It is generally preferred that the emulsion be of an "oil in water" type, with the ratio of aqueous medium to organic monomeric material between about 1.5:1 and about 10:1 in parts by weight. Suitable means are necessary to establish and maintain an emulsion and to remove reaction heat to maintain a desired reaction temperature. The polymerization may be conducted in batches, semicontinuously, or continuously. The total pressure on the system in making the modifying latex is preferably at least as great as the total vapor pressure of the mixture in the system, so that the initial reactant or reactants may be present in liquid phase. The reaction time may vary from 1 to 50 hours, depending upon the catalyst and the monomeric material employed, temperature, and other factors. When the desired degree of polymerization has been attained, unreacted material, together with any volatile impurities, may be removed, if desired, by any suitable means, such as by weathering or heating, say from about 50 to 70° C. under reduced pressure.

When employing a modifying latex prepared by copolymerizing a conjugated diolefin with a compound containing an active vinyl group, the conjugated diolefin should be used preferably in an amount of at least 40 weight per cent based upon the total monomer used, but in some cases lower concentrations of diolefin may be employed.

The resulting modifying latex is commingled with the resin latex. It is to be understood that the pH of the resin latex may be adjusted, if desired, to match that of the modifying latex with which it is to be mixed. The relative quantities of the two latices employed is best defined by using as a basis the polymer content (or solids content) of these latices. It is usually preferred to employ from 1 to 40 parts by weight of modifying polymer per 100 parts by weight of resin polymer. If the two latices have essentially the same polymer content, then they may be mixed in the above ratio, i. e., 1 to 40 parts modifying latex per 100 parts resin latex. However, when the polymer content of the modifying latex differs markedly from the polymer content of the resin latex, it will be necessary to adjust the quantity of modifying latex such that the final mixed latex will contain from 1 to 40 parts by weight of modifying polymer per 100 parts by weight of resin polymer.

Coagulation of the mixed latex may be carried out by any suitable coagulation means. The coagulating agent or agents should be so selected and applied that the precipitation of the constituent latices occurs concurrently. When employing the methanol-brine method previously mentioned, it is convenient to add methanol first, in an amount just short of that necessary to coagulate the olefin-sulfur dioxide resin, then complete the precipitation by adding methanol and brine simultaneously in small portions.

The modified resin is then separated from the serum by any suitable means, such as filtration, washed with methanol and water, or the like, and dried by any appropriate means, such as passing air heated to a temperature of around 50 to 70° C. over it for a period of time of say from 5 to 50 hours. After drying the product is ready for grinding, to prepare it for use as a molding resin or the like.

Advantages of this invention are illustrated by the following examples. The reactants, and their proportions, and the other specific ingredients of the recipes are presented as being typical and should not be construed to limit the invention unduly.

*Example I*

An olefin-sulfur dioxide resin was prepared by charging a reactor with the following recipe:

| | Parts by weight |
|---|---|
| 1-butene | 46.7 |
| Sulfur dioxide | 83.3 |
| Emulsifier (di-sec-butylnaphthalene sodium sulfonate) | 4.9 |
| Catalyst (lithium nitrate) | 0.5 |
| Water | 180 |

The mixture was agitated at a temperature of 30° C. for 1.5 hours after which the reactor was opened and the residual 1-butene and sulfur dioxide weathered off.

A butadiene-styrene latex was prepared by polymerizing the following formulation:

| | Parts by weight |
|---|---|
| Styrene | 30 |
| Butadiene | 70 |
| Soap flakes | 5 |
| Dodecyl mercaptan | 0.5 |
| Potassium persulfate | 0.3 |
| Water | 180 |

The polymerization was carried out at 50° C. for a period of 24 hours.

The olefin-sulfur dioxide resin latex was then treated with 25 per cent sodium hydroxide to raise the pH value to about 9 after which it was combined with the butadiene-styrene latex in a ratio of 9:1. The mixture was coagulated by adding a proportion of methanol just short of that required to coagulate the olefin-sulfur dioxide resin latex, this proportion being determined by a test on a small sample of the latex. The combined latices were then coprecipitated by adding simultaneously in small portions, methanol and a 25 per cent sodium chloride brine. During the coprecipitation step the system was thoroughly agitated to effect thorough contacting of the precipitating solutions with the latex and to prevent lumping of the product.

The coagulated resin was separated from the serum, washed with methanol and water and dried for 18 hours in a circulating air oven at 65° C. The dried product was then ground to a powder and dried for an additional 24 hours at 50° C. A sample of the powder was molded in a press, using a pressure of 1000 pounds per square inch and a temperature of 110° C. to provide a clear lustrous plastic disc.

Example II

A modified 1-butene-sulfur dioxide resin was prepared according to the method of Example I, using a polystyrene latex as the modifying agent. The polystyrene modifying latex was prepared using the same recipe as that previously employed for the butadiene-styrene modifier except that the butadiene was substituted by an equal quantity of styrene. The polymerization was carried to a 100 per cent conversion in a period of 18 hours.

Molding tests on the ground resin provided a hard plastic button.

Example III

A modified 1-butene-sulfur dioxide resin was prepared according to the method of Example I, using a butadiene-acrylonitrile copolymer latex as the modifying agent. The butadiene-acrylonitrile latex was prepared according to the following recipe:

| | Parts by weight |
|---|---|
| Acrylonitrile | 50 |
| Butadiene | 50 |
| Soap Flakes | 5 |
| Dodecyl mercaptan | 0.3 |
| Potassium persulfate | 0.3 |
| Water | 180 |

Polymerization was carried out at a temperature of 50° C. for 16 hours.

The olefin-sulfur dioxide resin latex was treated with 10 per cent sodium hydroxide to raise the pH value to approximately 8 after which the butadiene-acrylonitrile copolymer latex was added in a ratio of 1 part modifier latex to 14 parts resin latex (10 per cent by weight based on solids content). After mixing, the latices were coagulated as described in Example I.

The resin was separated, washed, dried, and ground as before. Molding was effected at 88° C. to provide a translucent, plastic button, less brittle than those prepared using butadiene-styrene and polystyrene modifier.

Example IV

A modified 1-butene-sulfur dioxide resin was prepared as described in Example III except that the ratio of modifier latex to resin latex was 1:3 (30 per cent by weight based on solids content). This resin was molded at 80° C. to provide a plastic button similar in appearance to that of Example III. This molded product was tough and non-brittle, capable of being carved or shaped on a lathe.

Example V

Another run similar to that of Example III was made using a butadiene-vinyl pyridine latex for the modifying agent. The butadiene-vinyl pyridine latex was prepared according to the recipe of Example III except that vinyl pyridine was substituted for the acrylonitrile. The ratio of modifying latex to 1-butene-sulfur dioxide latex was 1:13 (10 per cent by weight based on solids content). The product obtained by molding at 88° C. was a hard, translucent plastic, quite tough and non-brittle in texture.

Example VI

The run of Example V was repeated using butadiene-vinyl pyridine latex as the modifier. In this run the ratio of modifying agent latex to resin latex was increased to 1:3 (30 per cent by weight based on solids content). Molding was effected at 80° C. The product was a hard, plastic, quite tough and non-brittle material, capable of being carved or shaped by machine.

As will be evident to those skilled in the art, various modifications of this invention can be made, or followed, in the light of the foregoing disclosure and discussion, without departing from the spirit or scope of the disclosure or from the scope of the claims.

What is claimed is:

1. A method for producing a modified olefin-sulfur dioxide resin which comprises interreacting in a first reaction system equimolar proportions of sulfur dioxide and a normal butene while incorporated in an aqueous emulsion comprising between 150 and 1000 parts by weight of water per 100 parts by weight of said normal butene, a lithium nitrate catalyst in an amount between 0.03 and 0.6 part by weight per 100 parts of reactants and between 1 and 10 parts by weight per 100 parts of reactants of di-secondary-butyl naphthalene sodium sulfonate as an emulsifying agent, said first reaction system having a pH less than 7 after said interreaction; copolymerizing in a second reaction system a monomeric material consisting of equal parts by weight of butadiene and acrylonitrile while incorporated in an aqueous emulsion comprising between 150 and 1000 parts by weight of water per 100 parts by weight of said monomeric material and containing a potassium persulfate catalyst in an amount between 0.01 and 1 part by weight per 100 parts of said monomeric material and between 1 and 10 parts by weight per 100 parts of said monomeric material of an effective emulsifying agent, said second reaction system having a pH greater than 7 after copolymerization; increasing the pH of the reaction mixture from said first reaction system from a pH of less than 7 to a pH greater than 7 so as to match the pH of the reaction mixture from said second reaction system mixing a resulting reaction mixture from said first and said second reaction systems in the proportion such that the resulting mixture will contain from 1 to 40 parts by weight of polymer present in said second reaction mixture per 100 parts by weight of polymer present in said first reaction mixture; coprecipitating a modified butene-sulfur dioxide resin from the resulting mixture by the addition of methanol and an aqueous solution of sodium chloride, and recovering said resin as a product of the process.

2. A method for producing a modified olefin-sulfur dioxide resin which comprises interreacting in a first reaction system equimolar proportions of sulfur dioxide and a normal butene while incorporated in an aqueous emulsion comprising between 150 and 1000 parts by weight of water per 100 parts by weight of said normal butene, a lithium nitrate catalyst in an amount between 0.03 and 0.6 part by weight per 100 parts of reactants and between 1 and 10 parts by weight per 100 parts of reactants of di-secondary-butyl naphthalene sodium sulfonate as an emulsifying agent, said first reaction system having a pH less than 7 after said interreaction; copolymerizing in a second reaction system a monomeric material consisting of butadiene and acrylonitrile while incorporated in an aqueous emulsion comprising between 150 and 1000 parts by weight of water per 100 parts by weight of said monomeric material and containing a potassium persulfate catalyst in an amount between 0.01 and 1 part by weight per 100 parts of said monomeric material, and between 1 and 10 parts by weight per 100 parts of said monomeric material of an effective emulsifying agent, said second reaction system having a pH greater than 7 after said copolymerization; increasing the pH of the reaction mixture from said first reaction system from a pH of less than 7 to a pH greater than 7 so as to match the pH of the reaction mixture from said second reaction system mixing a resulting reaction mixture from said first and said second reaction systems in the proportion such that the resulting mixture will contain from 1 to 40 parts by weight of polymer present in said second reaction mixture per 100 parts by weight of polymer present in said first reaction mixture; coprecipitating a modified butene-sulfur dioxide resin from the resulting mixture by the addition of methanol and an aqueous solution of sodium chloride, and recovering said resin as a product of the process.

3. A method for producing a modified olefin-sulfur dioxide resin which comprises interreacting in a first reaction system equimolar proportions of sulfur dioxide and a normal butene while incorporated in an aqueous emulsion comprising between 150 and 1000 parts by weight of water per 100 parts by weight of said normal butene, a lithium nitrate catalyst in an amount between 0.03 and 0.6 part by weight per 100 parts of reactants and between 1 and 10 parts by weight per 100 parts of reactants of di-secondary-butyl naphthalene sodium sulfonate as an emulsifying agent, said first reaction system having a pH less than 7 after said interreaction; copolymerizing in a second reaction system a monomeric material consisting of butadiene and vinyl pyridine while incorporated in an aqueous emulsion comprising between 150 and 1000 parts by weight of water per 100 parts by weight of said monomeric material and containing a potassium persulfate catalyst in an amount between 0.01 and 1 part by weight per 100 parts of said monomeric material, and between 1 and 10 parts by weight per 100 parts of said monomeric material of an effective emulsifying agent, said second reaction system having a pH greater than 7 after said copolymerization; increasing the pH of the reaction mixture from said first reaction system from a pH of less than 7 to a pH greater than 7 so as to match the pH of the reaction mixture from said second reaction system mixing a resulting reaction mixture from said first and said second reaction systems in the proportion such that the resulting mixture will contain from 1 to 40 parts by weight of polymer present in said second reaction mixture per 100 parts by weight of polymer present in said first reaction mixture; coprecipitating a modified butene-sulfur dioxide resin from the resulting mixture by the addition of methanol and an aqueous solution of sodium chloride, and recovering said resin as a product of the process.

4. A method for producing a modified olefin-sulfur dioxide resin which comprises interreacting in a first reaction system equimolar proportions of sulfur dioxide and a normal butene while incorporated in an aqueous emulsion comprising between 150 and 1000 parts by weight of water per 100 parts by weight of said normal butene, a lithium nitrate catalyst in an amount between 0.03 and 0.6 part by weight per 100 parts of reactants and between 1 and 10 parts by weight per 100 parts of reactants of di-secondary-butyl naphthalene sodium sulfonate as an emulsifying agent, said first reaction system having a pH less than 7 after said interreaction; copolymerizing in a second reaction system a monomeric material consisting of butadiene and styrene while incorporated in an aqueous emulsion comprising between 150 and 1000 parts by weight of water per 100 parts by weight of said monomeric material and containing a potassium persulfate catalyst in an amount between 0.01 and 1 part by weight per 100 parts of said monomeric material, and between 1 and 10 parts by weight per 100 parts of said monomeric material of an effective emulsifying agent, said second reaction system having a pH greater than 7 after said copolymerization; increasing the pH of the reaction mixture from said first reaction system from a pH of less than 7 to a pH greater than 7 so as to match the pH of the reaction mixture from said second reaction system mixing a resulting reaction mixture from said first and said second reaction systems in the proportion such that the resulting mixture will contain from 1 to 40 parts by weight of polymer present in said second reaction mixture per 100 parts by weight of polymer present in said first reaction mixture; coprecipitating a modified butene-sulfur dioxide resin from the resulting mixture by the addition of methanol and an aqueous solution of sodium chloride, and recovering said resin as a product of the process.

5. A method for producing a modified olefin-sulfur dioxide resin which comprises interreacting in a first reaction system equimolar proportions of sulfur dioxide and an olefin containing not more than 20 carbon atoms per molecule while incorporated in a aqueous emulsion comprising between 150 and 1000 parts by weight of water per 100 parts by weight of said olefin, and containing a catalyst containing oxidizing properties suitable for effecting the reaction in an amount between 0.03 and 0.6 part by weight per 100 parts of reactants and between 1 and 10 parts by weight per 100 parts of reactants of an emulsifying agent effective in an acidic aqueous medium, said first reaction system having a pH less than 7 after said interreaction; polymerizing in a second reaction system a polymerizable aliphatic conjugated diolefin while incorporated in an aqueous emulsion comprising between 150 and 1000 parts by weight of water per 100 parts by weight of said conjugated diolefin and containing an effective polymerization catalyst in an amount between 0.01 and 1 part by weight per 100 parts of said diolefin and between 1 and 10 parts by weight per 100 parts of said diolefin of an effective emulsifying agent, said second reaction system having a pH greater than 7 after said polymerization; increasing the pH of the reaction mixture from said first reaction system from a pH of less than 7 to a pH greater than 7 so as to match the pH of the reaction mixture from said second reaction system mixing a resulting reaction mixture from said first and said second reaction systems in the proportion such that the resulting mixture will contain from 1 to 40 parts by weight of polymer present in said second reaction mixture per 100 parts by weight of polymer present in said first reaction mixture; coprecipitating a modified olefin-sulfur dioxide resin from the resulting mixture, and recovering said resin as a product of the process.

6. A method for producing a modified heteropolymeric resinous material which comprises interreacting in a first reaction system equimolar proportions of sulfur dioxide and an unsaturated organic compound capable of reacting with sulfur dioxide to form a resin containing not more than 20 carbon atoms per molecule while incorporated in an aqueous emulsion comprising between 150 and 1000 parts by weight of water per 100 parts by weight of said unsaturated organic compound, and containing a catalyst suitable for effecting the reaction in an amount between 0.03 and 0.6 part by weight per 100 parts of reactants and between 1 and 10 parts by weight per 100 parts of reactants of a suitable emulsifying agent, said first reaction system having a pH less than 7 after said interreaction; polymerizing in a second reaction system a polymerizable monomeric compound having an active vinyl group attached thereto and containing not more than 20 carbon atoms per molecule while incorporated in an aqueous emulsion comprising between 150 and 1000 parts by weight of water per 100 parts by weight of said monomeric material and containing a suitable catalyst in an amount between 0.01 and 1 part by weight per 100 parts of said monomeric material and between 1 and 10 parts by weight per 100 parts of said monomeric material of suitable emulsifying agent, said second reaction system having a pH greater than 7 after said polymerization; increasing the pH of the reaction mixture from said first reaction system from a pH of less than 7 to a pH greater than 7 so as to match the pH of the reaction mixture from said second reaction system mixing a resulting reaction mixture from said first and from said second reaction system in the proportions such that the resulting mixture will contain from 1 to 40 parts by weight of polymer present in said second reaction mixture per 100 parts by weight of polymer present in the first reaction mixture; coprecipitating a modified heteropolymeric resinous material from the resulting mixture, and recovering said resinous material as a product of the process.

7. A method for producing a modified olefin-sulfur dioxide resin which comprises interreacting in a first reaction system sulfur dioxide and an olefin, which olefin contains not more than 20 carbon atoms per molecule, while incorporated in an aqueous emulsion containing at least as much sulfur dioxide as is molecularly equivalent to said olefin and a catalyst suitable for effecting said reaction, and containing also an emulsifying agent effective in an acidic aqueous medium, said first reaction system having a pH less than 7 after said interreaction; polymerizing in a second reaction system a polymerizable monomeric compound having an active vinyl group attached thereto while incorporated in an aqueous emulsion, said second reaction system having a pH greater than 7 after said polymerization; increasing the pH of the reaction mixture from said first reaction system from a pH of less than 7 to a pH greater than 7 so as to match the pH of the reaction mixture from said second reaction system mixing a reaction product mixture from said first and from said second reaction systems in the proportions such that the resulting mixture will contain from 1 to 40 parts by weight of polymer present in said second reaction mixture per 100 parts by weight of polymer present in the first reaction mixture; coprecipitating a modified olefin-sulfur dioxide resin from the resulting mixture, and recovering said resin as a product of the process.

8. A method for producing a modified olefin-sulfur dioxide resin material which comprises interreacting in a first reaction system equimolar proportions of sulfur dioxide and an olefin, which olefin contains not more than 20 carbon atoms per molecule, while incorporated in an aqueous emulsion containing at least as much sulfur dioxide as is molecularly equivalent to said olefin and a catalyst suitable for effecting said reaction; and containing also an emulsifying agent effective in an acidic aqueous medium, said first reaction system having a pH less than 7 after said interreaction; polymerizing in a second reaction system a polymerizable monomeric compound having an active vinyl group attached thereto while incorporated in an aqueous emulsion containing a suitable polymerization catalyst and an emulsifying agent, said second reaction system having a pH greater than 7 after said polymerization; increasing the pH of the reaction mixture from said first reaction system from a pH of less than 7 to a pH greater than 7 so as to match the pH of the reaction mixture from said second reaction system mixing a resulting reaction mixture from said first and from said second reaction systems in the proportions such that the resulting mixture will contain from 1 to 40 parts by weight of polymer present in said second reaction mixture per 100 parts by weight of polymer present in the first reaction mixture, and coprecipitating a modified olefin-sulfur dioxide resin from the resulting mixture.

9. A method for producing a modified olefin-sulfur dioxide resin material which comprises interreacting in a first reaction system sulfur dioxide and normal butene while incorporated in an aqueous emulsion containing at least as much sulfur dioxide as is molecularly equivalent to said normal butene and lithium nitrate as a catalyst, said first reaction system having a pH less than 7 after said interreaction; polymerizing in a second reaction system butadiene incorporated in an aqueous emulsion, said second reaction system having a pH greater than 7 after said polymerization; increasing the pH of the reaction mixture from said first reaction system from a pH of less than 7 to a pH greater than 7 so as to match the pH of the reaction mixture from said second reaction system mixing a resulting latex from said first and from said second reaction systems in the proportions such that the resulting mixture will contain from 1 to 40 parts by weight of polymer present in said second reaction mixture per 100 parts by weight of polymer present in the first reaction mixture, and coprecipitating a modified butene-sulfur dioxide resin from the resulting latex mixture.

10. A method for producing a modified heteropolymeric resinous material which comprises interreacting in a first reaction system sulfur dioxide and an unsaturated organic compound which reacts with sulfur dioxide to form a heteropolymer while incorporated in an aqueous emulsion, said first reaction system having a pH less than 7 after said interreaction; polymerizing in a second reaction system a polymerizable monomeric compound having an active vinyl group attached thereto while incorporated in an aqueous emulsion, said second reaction system having a pH greater than 7 after said polymerization; increasing the pH of the reaction mixture from said first reaction system from a pH of less than 7 to a pH greater than 7 so as to match the pH of the reaction mixture from said second reaction system mixing a resulting reaction mixture from said first and from said second reaction systems in the proportions such that the resulting mixture will contain from 1 to 40 parts by weight of polymer present in said second reaction mixture per 100 parts by weight of polymer present in the first reaction mixture, and coprecipitating a modified heteropolymeric resinous material from the resulting mixture.

11. The process of claim 5 wherein the polymerizable material is a mixture of butadiene and styrene.

12. The process of claim 5 wherein the polymerizable material is a mixture of butadiene and acrylonitrile.

13. The process of claim 5 wherein the polymerizable material is a mixture of butadiene and vinyl pyridine.

14. The process of claim 5 wherein the catalysts used in the first and second reaction systems contain oxidizing properties.

WILLIE W. CROUCH.

REFERENCES CITED

The following references are of record in the file of this patent:

UNITED STATES PATENTS

| Number | Name | Date |
|---|---|---|
| 2,138,584 | Marvel | Nov. 29, 1938 |
| 2,146,276 | Wilder | Feb. 7, 1939 |
| 2,371,719 | Starkweather | Mar. 20, 1945 |
| 2,372,299 | Snow | Mar. 27, 1945 |
| 2,410,395 | Smidth | Oct. 29, 1946 |

OTHER REFERENCES

Bacon et al., Proc. Rubber Tech. Conference, Paper No. 57, pages 525–529 London (1938).